July 28, 1953  O. WALDRICH  2,646,727
PLANING MACHINE
Filed June 20, 1949  9 Sheets-Sheet 1

Inventor:
O. Waldrich
by
Attorneys

July 28, 1953  O. WALDRICH  2,646,727
PLANING MACHINE
Filed June 20, 1949  9 Sheets-Sheet 5
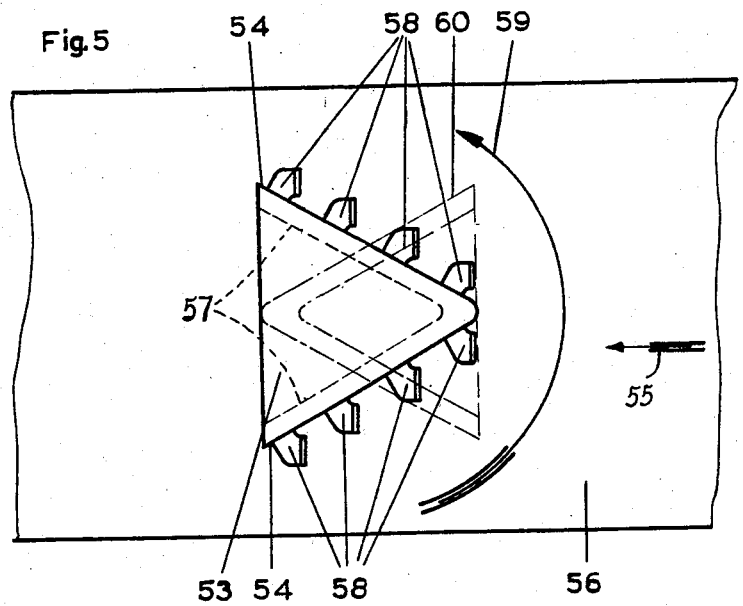
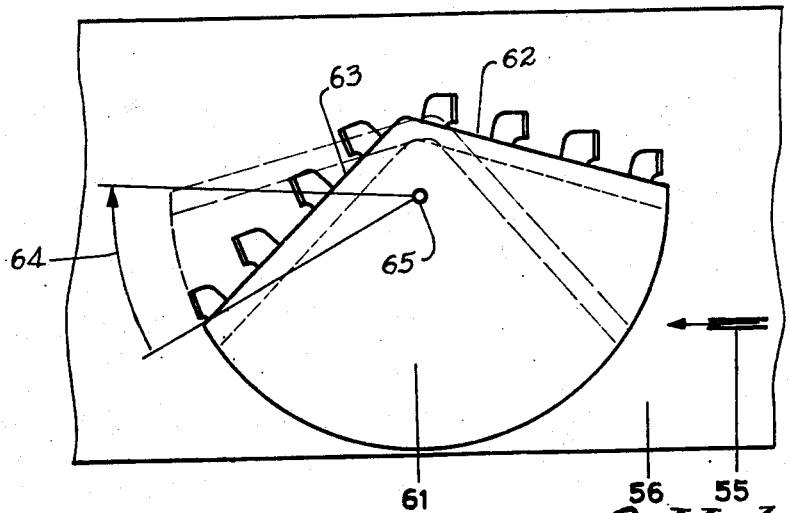
Inventor:
O. Waldrich
by
Attorneys

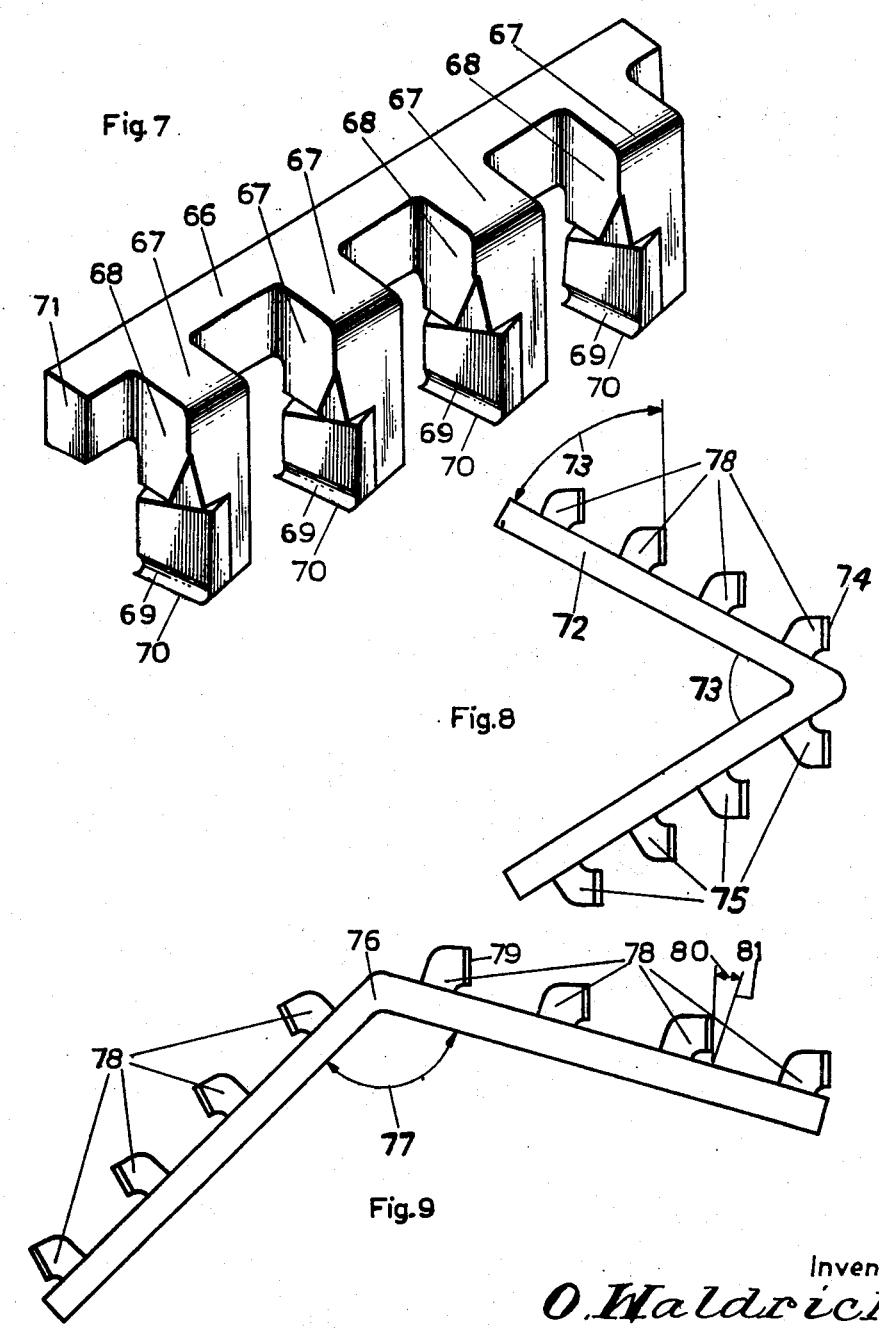

July 28, 1953  O. WALDRICH  2,646,727
PLANING MACHINE
Filed June 20, 1949  9 Sheets-Sheet 7

Inventor:
O. Waldrich
by
Glascock Downing Seebold
Attorneys

July 28, 1953     O. WALDRICH     2,646,727
PLANING MACHINE

Filed June 20, 1949     9 Sheets-Sheet 8

Inventor:
O. Waldrich
by Attorneys

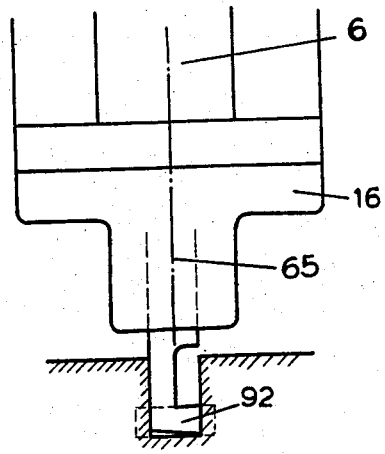
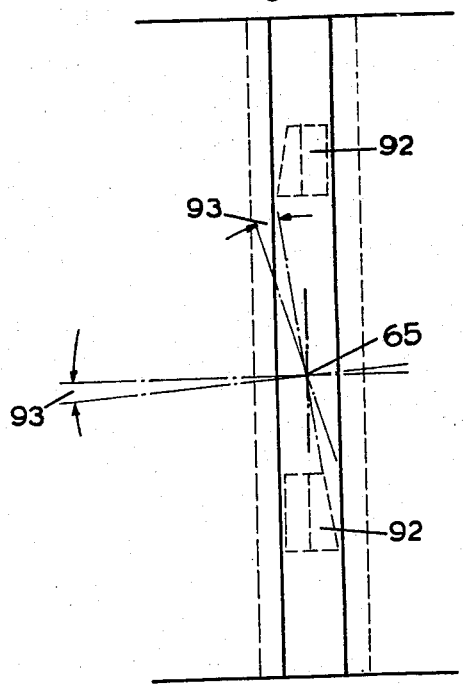

Patented July 28, 1953

2,646,727

UNITED STATES PATENT OFFICE 2,646,727

PLANING MACHINE

Oskar Waldrich, Werthenbach, Kreis Siegen, Germany

Application June 20, 1949, Serial No. 100,185
In Germany October 1, 1948

8 Claims. (Cl. 90—53)

In the usual metal planing machines generally only the forward motion of the table with the work piece beneath the fixed tool can be used as a working stroke while the return motion of the table and work piece cannot be utilised to contribute to the output. The connection between the tool and the tool head in the known constructions of planing machine is effected by a clapper hinged to the head and serving as a tool holder. The axis of the hinge between the head and the clapper is as a rule transverse to the direction of motion of the work piece in relation to the tool head, and on the working stroke the clapper bears rigidly against the head. Various measures and devices are made use of to increase the rigidity. During the return of the work piece however the clapper lifts from the slide by swinging about the hinge axis. In this way damage to the tool by the work piece is avoided. The rigidity of the connection is however quite insufficient to ensure a complete chatter-free cut when tools with high cutting speeds are employed and in working with negative rake tools. As these conditions are however basic requirements for the full utilisation of for example carbide tools, such utilisation has not been possible hitherto. An object of the present invention is in the first place to dispense with the use of a clapper and in its place to use a means by which complete rigidity of the tool holder is ensured.

It has been attempted to make use of the return stroke in planing machines as a working stroke and this has been done for example by the provision of a second clapper working in the opposite direction to the first. But the whole arrangement was thereby rendered less rigid so that the high cutting speeds which carbide tools in themselves permit were still less possible. Further, apart from the lower cutting speeds these arrangements only permitted very low loads, so that these machines with cutting strokes in both directions were only suitable for light cuts, for example, for finishing cuts. Such arrangements have not therefore come into general use. A further object of the present invention is to overcome this defect and while using the return stroke as a working stroke, to load the tool to its limit imposed by the properties of the carbides.

According to the invention a tool holder which can be rigidly and firmly held in the tool head or a part thereof but is also adjustably journalled at right angles to the direction of movement is rotated at the end of each working stroke through such an angle that plurality of tools eccentrically mounted thereon and symmetrically disposed are brought into working position in sequence.

The saving in working time and power consumption with the return stroke utilised, as is known, is quite considerable and is now entirely independent of the kind of operation and the depth of cut. This applies particularly to the case of carbide tools because the high cutting speeds of such tools do not permit an increase of the return stroke above the cutting speed as used to be the case and in consequence the utilisation of the return stroke effects a reduction in operating time of a full 50 per cent and a reduction of power consumption which also approaches 50 per cent.

It has already been proposed to rotate a single tool secured at the end of a spindle and moving with it, through 180° and so cause it to operate on the return stroke. This arrangement has the same faults as the tool clapper. The journalling of the spindle is not free of play and the arrangement is only suitable for light work because the construction does not operate free from vibration. Further it has the disadvantages over the invention that the tool is overloaded, because being used on both sides it must be symmetrically ground, and also that simultaneous roughing and finishing during the forward and return strokes is quite impossible. Finally the arrangement according to the invention has further advantages which will be explained below.

The means for putting the invention into practice comprises a multi-sided holder rigidly secured to or in some cases in one piece with, the tool head, the axis of which holder may lie perpendicular to the direction of movement of the workpiece. It is important however that in machining horizontal surfaces, this axis should not be perpendicular to the feed direction but should be at a certain inclination to it, so that the tools which are not cutting stand clear of the surface being machined. In general it is also preferable in universal machines to make the inclination between the toolhead and the cross-beam adjustable, but then the tool head naturally cannot be made integral with the multi-sided holder. Within the multi-sided holder, which may for example have a bore of regular hexagonal or octagonal cross section, is longitudinally slidable a prismatic member of corresponding section, which is slidable automatically or by hand, and is preferably in either case clampable during the working period. It serves for adjustment of the height of the tool or in the machining of vertical surfaces. At the upper end of this prismatic member according to one form of the invention, a gear can be provided by means of which a spindle of circular cross section longitudinally slidable in the prismatic member can be projected at the lower end of the holder by an automatic control at the end of each working stroke and rotated through the aforesaid angle. At the lower end of the spindle is provided the actual tool holder which in the working position, i. e. in the retracted position of the spindle, is directly connected with the prismatic member through a positive coupling.

The angle through which the spindle rotates at the end of each working stroke can be 180°. Then for example two symmetrically disposed tools are provided, it being understood that the setting of these tools must be accurately effected by the aid of suitable devices, so that the chip severed from the work piece is of the same thickness each time and the loading of the work piece and machine is accordingly the same at each stroke. The angle can be made smaller, however, for example, 90°, 60° or 45°, a corresponding higher number of tools being arranged on the periphery of the tool holder, provided only that care is taken that the tools not in operating position do not interfere with the working operation. It is accordingly possible to bring for example, four, six or eight tools into action in succession. Such an arrangement can be employed because of the advantage that provided only that the tools are accurately set, they are less quickly blunted and in consequence the largest work pieces can be machined with the greatest accuracy and uniformity. On the other hand the use of more than two tools makes it possible for the first time, particularly in the case of small work pieces which are not easily secured in the machine, to effect roughing and finishing simultaneously. For example, a square tool holder is used and on the opposite sides are arranged two roughing tools and on the other two opposite sides two finishing tools, each two similar tools naturally being similarly adjusted, but the finishing tools being differently adjusted from the roughing tools. The holder is then rotated through 90° after each stroke but the tool head is only fed forward after each second partial rotation. Then the first makes a roughing cut, the second without any intervening feed thereupon makes a finishing cut but a little behind the roughing tool in the feed direction. After the feed, in the third stroke the third tool makes a roughing cut, and in the fourth stroke the last tool makes a finishing cut. This mode of operation is only possible in machines according to the invention because the pre-requisite is the rotational movement of the tool holder and the eccentric disposition of the tool.

The arrangement of the gear and coupling can be of other construction. Also any desired suitable gear, for instance hydraulic or mechanical can be used.

A condition for the reliable operation of an arrangement according to the invention is, as already mentioned, the complete rigidity of the system. This can be ensured according to the invention by the use of the known measure of clamping together parts that engage one in another by the provision of longitudinal slots and closing members. Thus according to the invention at least the multi-sided holder and the prismatic member may for example have longitudinal slots and be provided with suitable means such as electromagnets, wedges, toggles, screws or similar closing members for releasing and gripping the prismatic member in the multi-sided holder and the spindle in the prismatic member. It will be understood that these clamps are only maintained during the working periods and must be released during the rotational movements of the spindle. For this reason according to the invention the said clamps are automatically operated, mechanically, hydraulically, electrically or any other way. Only by this means in conjunction with those above described can the invention be practically used and given its full effect. Thereby the rigidity of the fixing on the return stroke is ensured for the first time by the fact that the path for the forces from the tool through the tool holder, the rigid coupling, the spindle, the prismatic member and its holder is only through reliable and fully positive and play-free rigid fixings. In the same way, however, as far as possible the tool head should be rigidly clamped to the cross-beam and the cross-beam to the columns either during the whole period of machining or during the actual working strokes.

For the clamping of the parts to one another a particular example will be referred to, which has shown itself to be highly satisfactory. According to this particular construction which falls within the scope of the invention, the prismatic member can be embraced by a bridge which may also have the form of a ring corresponding with the prismatic member or of a cross piece, and this bridge be clamped by two or more clamping elements secured to its ends, against a corresponding number of sliders which run in guide grooves in the cross-beam. In this way the prismatic member is directly secured to the cross-beam and the tool head located between the two is simultaneously clamped. The complete arrangement is thus given a high degree of rigidity.

The clamping of the bridges to the sliders, i. e. of the prismatic member to the cross-beam can be effected mechanically by journalling a cross-shaft in the cross-beam parallel to the beam and preferably passing through the tool head. Most important is that this cross-shaft should lie between the bridge and the slide-guide groove in the cross-beam, because its purpose is to transmit the relative clamping movement of the two parts. Eccentrics can be journalled in the ends of the bridge, which have their bores slidable on but keyed to the cross-shaft and so can be turned thereby. These eccentrics are embraced by two straps which in their turn slide with sliders in the guiding grooves in the cross-beam. The tool head with the prismatic member then remains slidable on the cross-beam. The sliding movement is shared by the bridges, the eccentrics and the straps with their sliders, but by rotation of the shaft and actuation of the eccentrics clamping can be effected at any time whether by hand or automatically during each working stroke.

As already mentioned, clamping of the spindle on the prismatic member and of the prismatic member to the cross-beam does not alone suffice to ensure complete rigidity of the arrangement, but in addition the cross-beam must also be clamped to the columns. Here an arrangement known per se can be used with advantage, in which the cross-beam engages between the columns with a box-form part stiffened by cross walls. If this part is made of large size and the columns are given a corresponding cross-section deep in the working direction, for example a rectangular form, which can also be made light but rigid by the use of stiffening walls, then the clamping can be effected at the four corners or better on the vertical edges of the columns or of the box part of the cross-beam, corresponding to these corners. In this way the problem is solved of transmitting the forces from the tool to the base of the machine through completely rigid and rigidly connected parts.

A further simplification can be effected by making the spindle rotatable only, provision for longitudinal movement being omitted. This can be effected by omitting the above described coupling between the spindle and prismatic member and replacing it with some other securing device acting upon the periphery of the spindle instead of its end surfaces. For example simple stops can be provided which firmly limit the angle of rotation. However the arrangement is only of use in conjunction with the above described measure, according to which the parts, in this case in particular the spindle and the prismatic member, are rigidly and reliably clamped together as long as the tools are in action. Otherwise the same faults would make themselves noticeable as arise with the use of the known tool clapper. In suitable cases with reliable clamping the stops can be entirely omitted and correspondingly accurate construction of the gear for rotating the spindle be used. But both measures can be used together, and the stops be provided as well as the clamping device.

Stops can be used in particular when the spindle after each working stroke is always turned through the same angle e. g. 180°, in the same direction. The stops must then be so arranged that during rotation they are taken out of the way of the counter-stops of the spindle. This is also necessary if the stops are to be used not only to limit the rotation but also at the same time to fix the spindle in the prismatic member, that is if for example the spindle is provided at one place in its periphery with a wedge shaped projection and this can be clamped between retractable projections of corresponding shape in the prismatic member, the latter projections in the present example being arranged at 180° intervals.

But with this arrangement of retractable stops the rigidity of the construction may in some circumstances be insufficient. Accordingly provision may be made for the stops on both parts, that is on the spindle and the prismatic member to be rigid and to work in one direction only, the positive, play-free and rigid connection of the parts then being ensured by the clamping devices and the like already mentioned. But then a continued rotation in the same direction of the spindle can no longer take place. For this reason the spindle must simply be rotated in one direction through a determined angle and the next working stroke rotated in the opposite direction through the same angle. Here again, the stops can naturally be omitted if the movement is sufficiently exactly controlled by other means and the parts are sufficiently rigidly clamped.

It has been found that the rigidity of the described system is so great that a method of operation already used on lathes can be used without objection, according to which on the periphery of the tool holder of a planing machine in accordance with the invention, alongside each of the symmetrically disposed tools, one or more further tools are arranged which in the working direction are one behind another and come into action one after another in the same stroke. In the case of a spindle which always rotates in the same direction after each working stroke, the tool holder may be made square. If now several tools are set one behind another between each pair of parallel, flat clamping surfaces of the tool holder, and the holder is so skewed on the spindle in relation to the direction of movement that the overlap of the tools corresponds to the desired width of chip, and further if the feed between two working strokes is made equal to the product of the chip width and the number of tools, the above described purpose is achieved. The overlap of the tools one relative to another is obtained in this case by mounting the tools on the clamping surface exactly in line and all equally projecting from the holder, and at the same time skewing these clamping surfaces so far round the spindle axis that the clamping surfaces make an angle to the direction of movement of the work piece which in conjunction with the equal spacing of the individual tools mounted on one clamping surface in the working direction, results in a projection of each tool beyond the next which corresponds to the desired width of chip. This width multiplied by the number of tools gives the feed of the tool head which must be effected at the end of each stroke at the same time as the rotational movement of the tool holder.

In planing with the aid of such an arrangement it must be borne in mind that the angle between the edge of the tool holder and the direction of movement must also be reversed when the direction of travel is reversed. If this angle amounts for example to 30° and the angle of rotation without reference to this inclination is 180°, the rotation of the tool holder after each stroke is not 180° but after the first stroke must be 180°+(2×30°)=240°, and after the second stroke 180°−(2×30°)=120°. The same purpose can be achieved however by letting the tool holder rotate through 180° each time, but making the tool holder so that its edges seen in the direction of its axis of rotation are not parallel to one another but at the above specified acute angle, the direction of the angle being appropriately related to the directions of the working strokes.

With the grouped arrangement of the tools it is of advantage to combine them into a single piece, that is to clamp on the tool holder as for example a rectangular bar provided with projections corresponding in number to the number of tools to be used, which reach down to the work piece, are bent to face the direction of movement and on their end faces carry the plate-form cutting bits for example of carbide which are welded to the novel tool-bar. It is now possible accurately to determine the relative positions of the cutting edges and the angles of the bits and to grind them in common in a device provided for the purpose. The rigid holding together of the tools is thereby also ensured under all circumstances and with the greatest accuracy If the use of tool-bars which while presenting a group of tools are independent of the form of the tool holder, is possible, then the use of a tool holder having tool-clamping surfaces which are directly adjacent and at an angle to one another, presents the possibility of combining two tool groups into a single piece which will hereinafter be referred to as an angle bar. The rigidity of the arrangement is thereby still further increased. Such an arrangement is possible both when the spindle always rotates through the same angle in the same direction, and when the rotation is always through the same angle but oscillatory. In the latter case the clamping surfaces must be at an angle to one another which is increased to a value equal to the sum of the angle of rotation and twice the skew angle of the tools. Then the projections for the individual tool bits are all of equal size and this is to some extent a limitation. If however it is desired to set the clamping surfaces of the tool holder at an angle equal to the angle of rotation and further to maintain the possibility of varying the number of tools, width of cut and thereby of the total feed after each second working stroke, this can be done by making angle bars of which the projections are of different lengths, each being longer than the preceding by the required amount of overlap. In this case the tool holder remains invariable but at the same time the possibility remains of the greatest variations in the tooling.

Naturally, intermediate arrangements can be used. Thus the clamping surfaces of the tool holder can be set at an angle to one another which corresponds to the sum of the angle of rotation and twice the amount of a certain mean skew angle. Then according to the desired overlap, the projections can be either of equal length, or increasing or decreasing in succession, the difference in length between the projections nevertheless not being very considerable.

In addition to the above described possibilities of rigid combination of the tool bars, with suitably strong construction and correct formation, an adjustable arrangement can be provided, if the grouped tools or tool bars are pivotable in the tool holder in relation to the working direction. Here also if necessary clamping of the hinge can be provided, but it can also be so constructed that the setting up of vibrations is not to be feared. This applies particularly to the case in which the tool holder is used for side planing.

The eccentricity which so far has contemplated that the tools seen in the working direction are placed laterally displaced from the spindle axis, can also be given embodiment by placing the tools in front of and behind the spindle axis, though in some cases one of them may be in line with the axis. Thus for example two tools can be used, of which one is placed a certain distance in front of, and the other for example the same distance behind, the spindle axis. If then one tool is set in deeper than the other or if a correspondingly pivotable tool bar is used, of which the overlap in depth is adjustable, the arrangement can be used for machining grooves and the reserve power of a heavy machine utilised for this purpose also, because naturally any desired number of tools can be set one behind another. While in the previously described cases, the lateral eccentricity of the tools afforded particular advantages, it is not necessary in the present case, although it can be used to obtain more efficient loading conditions in special machines for this purpose. The aligned arrangement can however be dispensed with and the machining of grooves also be effected with the previously described arrangements.

In further development of this idea of the use of eccentric, but preferably aligned tools, using the pivotability of the spindle, a corresponding arrangement can be constructed with which T-slots can be machined. As feed must in this case be provided on both sides, but always over a narrowly limited extent, the arrangement can be such that preferably only two tools are disposed eccentrically on the spindle and project outwardly, and these, separately ground in the usual way, are swung about the spindle axis after each stroke. In this way it is possible for the tools, of which on each stroke one cuts one side of the T-slot and the other the other side, to be spread apart as seen in the working direction by the swinging of the spindle and thus to increase the breadth of the T-slot.

In the accompanying drawings,

Figure 5 is a diagrammatic plan view of another form of tool holder.

Figure 6 is a diagrammatic plan view of yet another form of tool holder.

Figure 7 shows a tool bar for use in a tool holder in accordance with Figure 4; and Figures 8 and 9 show angle bars for use respectively in tool holders in accordance with Figures 5 and 6.

Figures 14 and 15 an arrangement for planing T-slots, making use of the return stroke.

Figure 2:
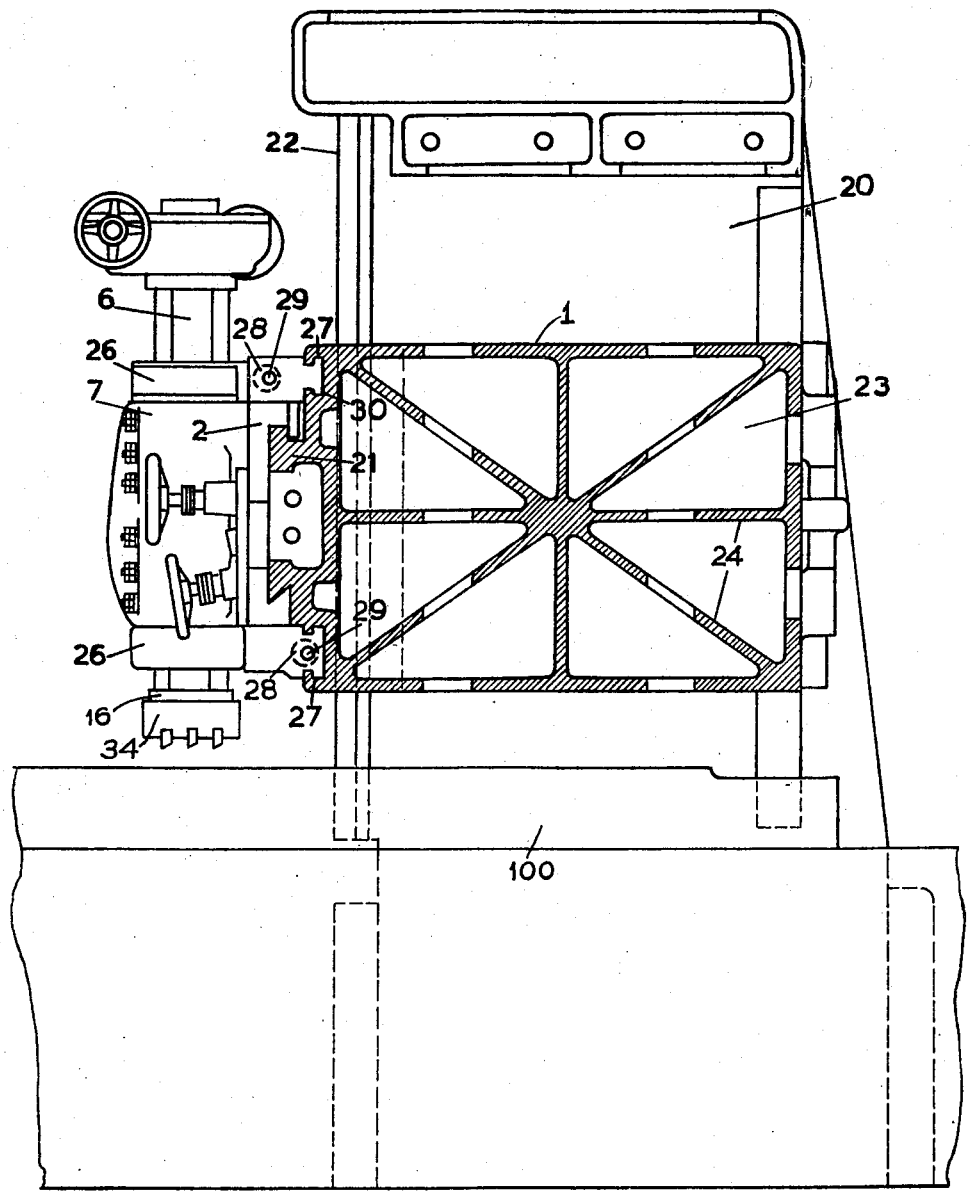
Figure 2 is a cross section of the cross-beam with the tool head and one column in elevation, the means for clamping the prismatic member to the cross-beam also being indicated.

The cross-beam 1 can in the usual way be raised and lowered on the side columns 20, as shown in Figure 2, of the machine. The tool head 2 can be fed horizontally along the ways 3 of the cross-beam for example either automatically or stepwise by conventional mechanisms (not shown), and can be clamped during each working stroke to the beam just as can the latter to the columns. The octagonal holder 4 is constructed as a separate part and is pivotally mounted on the head 2 by a spigot 5 so that its axis can be set at any desired angle in relation to the bed 100. In machining a horizontal surface, this angle must differ sufficiently from 90° for the tools not in action to stand clear of the work piece. After adjustment of the angle the holder 4 is made rigid by bolting or clamping devices. In the holder 4 is carried an octagonal prismatic member 6 at the upper end of which is a gear 7. This serves as described below, to effect the downward, rotational and upward movement in accordance with the invention.

In the cross-beam 1 is journalled a driving shaft 8 which through bevel gears 9, 10 transmits rotation to another pair of bevel gears 11, 12. The shaft 8 and bevel wheel 9 are provided with a keyway and feather connection, and the wheel 9 together with the rigidly coupled wheels 10, 11 are carried in the spigot 5, the latter two wheels being co-axial with the spigot. The wheel 12 is provided with an internal thread and actuates a threaded spindle 13 fixedly carried in the prismatic member 6. In this way from the end of the cross-beam 1 the height adjustment of the prismatic member and so of the tool can be effected. This height adjustment can be effected either at the beginning of machining so far as the feed is to take place in the horizontal direction and is to be effected by the movement of the head 2 on the cross-beam 1 by appropriate mechanisms (not shown). It is also possible to use the height adjustment as a feed and to machine vertical surfaces, for which purpose it is only necessary to provide the tool holder described below with corresponding perpendicular clamping surfaces and to make these clamping surfaces relatively adjustable and downwardly wedge shaped for the reception of several tools working in staggered formation.

Such an arrangement makes possible for the first time, using the present invention, to avoid the use of a plurality of tool heads on a planing machine and yet to carry out machining horizontally as well as vertically at will.

This means a considerable simplification of the planing machine according to the invention and a reduction of cost of manufacture as well as in the quantity of material used. This simplification also results in an increase in the rigidity of the whole machine because the individual heads interfered with one another and by their elimination the construction becomes more unitary. It may also be mentioned that such known machines with a plurality of tool heads could only be used in rare, exceptional cases because the adjustment and manipulation of the several heads took more time and was a source of more errors than the expected advantages were worth. Accordingly as a rule such known arrangements have been used in practice only to a very limited extent.

The gearing 7 arranged at the upper end of the prismatic member 6 receives its motion from a motor 14. This gearing is in itself not part of the invention and can be replaced by any other suitable gearing for example a hydraulic mechanism. At the lower end of the spindle 15 is arranged the tool holder 16, and a coupling 17 under the action of a helical spring 18 which acts upwardly on spindle 15 ensures rigid connection of the holder 16 with the lower end 19 of the prismatic member.

Figure 3:
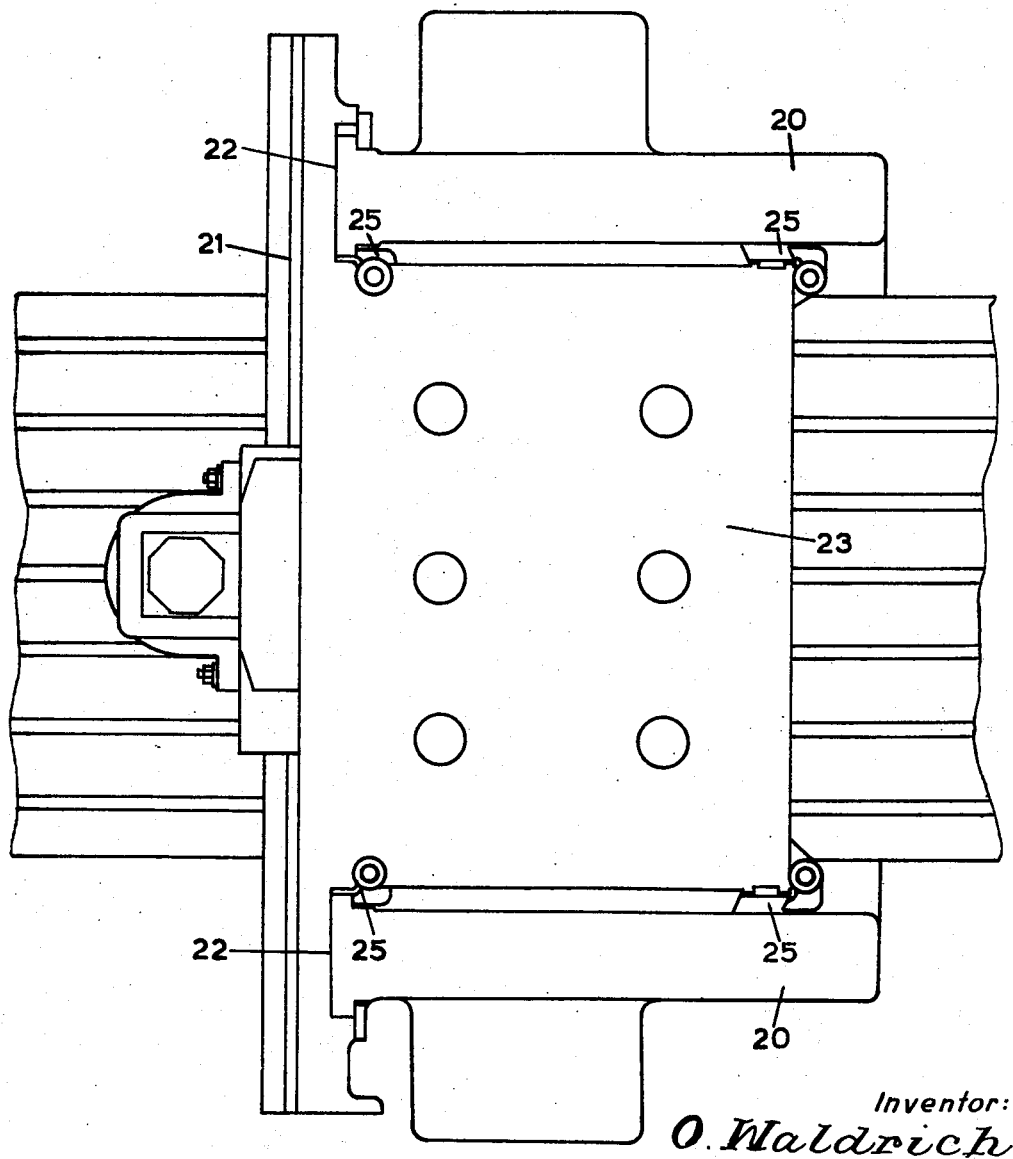
Figure 3 is a plan view of Figure 2 with certain parts omitted, showing particularly the clamping of the cross-beam to the columns.

As can be seen from Figures 2 and 3, the columns 20 of the planing machine there illustrated are of deep section and have a corresponding rectangular form in section, which gives them a high moment of resistance. The supporting rail 21 of cross-beam 1 is disposed forwardly of the columns 20 in the usual way but it has a central box part 23 which projects far between the columns. The box part is made rigid by stiffening walls 24 and at its front and rear corners 25, that is in all at four places, is additionally guided on the columns and may be suitably clamped thereto, so that the cross-beam and columns after actuation of the clamping means are united into a rigid unit.

The prismatic member 6, as Figure 2 shows, is embraced above and below the polygonal holder 7 by two bridges 26. These are connected with respective sliders 27 by means of eccentrics indicated in dotted lines at 28, which can be so adjusted by cross-shafts 29 that the bridges and cross-beam are drawn together and so clamp the prismatic member 6, the octagonal holder 4 and the tool head 2 against the cross-beam 29, the sliders being slidable in corresponding guide grooves 30 in the cross-beam. The cross-shafts 29 obviously are arranged parallel to the grooves 30 and both lie horizontally.

Figure 4:
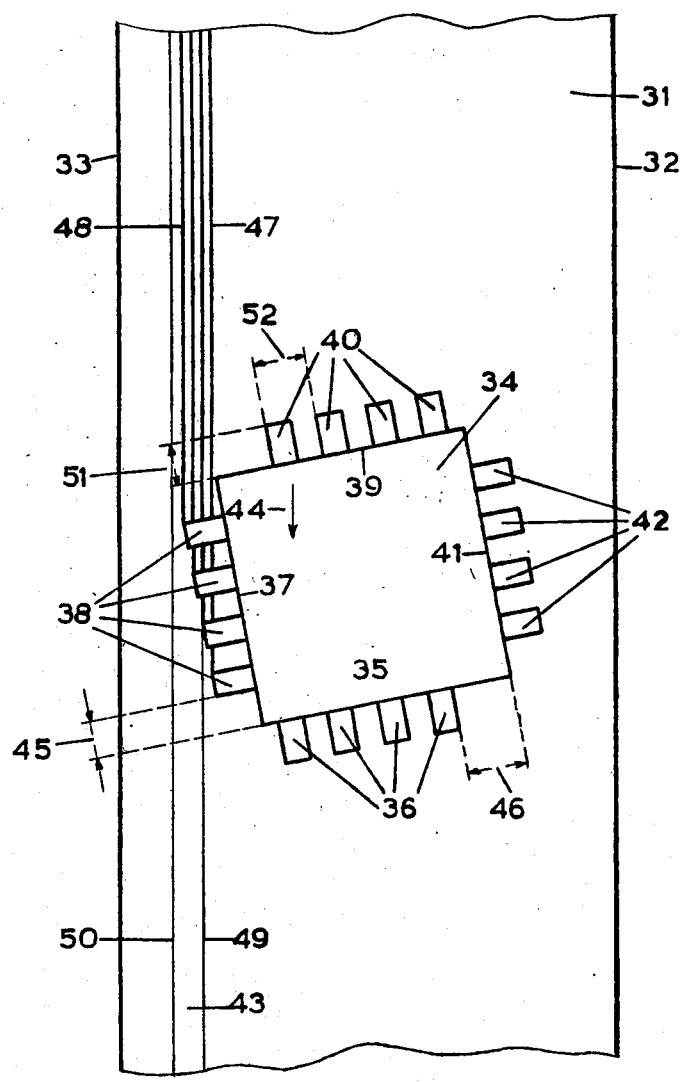
Figure 4 is a diagrammatic plan view of part of a work piece with an outline of a tool-holder above it.

Figure 4 shows diagrammatically a part of a work piece and above it in outline a tool holder. The work piece 31 lies with its edges 32 and 33 parallel to the axis of rotation of the holder 4 on the supporting spigot 5. The tool holder 34 is of square cross section and on each side carries four tools. The side 35 carries four roughing tools 36, the side 37 four finishing tools 38, the side 39 again four roughing tools 40 and the side 41 four finishing tools 42. The tool holder on its edge 37 in working position forms with the direction of movement parallel with the work piece edge 33, an acute angle of 15° in counterclockwise direction. In the position shown, in the previous stroke the roughing tools 36, having been disposed in alignment one behind the other with respect to the direction of travel of the work piece, have roughed out a strip 43 and thereafter the holder has rotated about the axis of spindle 15 in the direction of the arrow 44 through $90° + (2 \times 15°) = 120°$. The finishing tools 38 have thereby been brought into skewed position. As can be seen on account of the angular position of the edges 35, 37, 39, 41 of the tool holder in relation to the edges 32, 33 of the work piece and therefore in relation to the direction of movement, all four come into action in succession. As, however, the distance 45 of the first finishing tool from the edge 35 of the tool holder is less than the corresponding distance 46 of the first roughing tool from the edge 41 of the tool holder, only a strip lying between the bountary lines 47 and 48 will be finish machined, whereas the preceding roughing cut was effected between the lines 49 and 50. In Fig. 4 the holder 4 has been rotated about the axis of spigot 5 so that the tool holder 34 and with it the spindle 15 has a slight inclination to the vertical in a direction which inclines the upper end of the spindle more towards the edge 33 (Figure 4) and the lower end more towards the edge 32, the tools 36, 40 and 42 are also safely raised from the surface to be machined, these tools out of working position naturally not lying parallel to the horizontal. This requires a corresponding setting of the groove in which the tool bits are received in a bit holder. After the return of the work piece 33 the tool holder 34 is rotated about the axis of spindle 15 through $90° - (2 \times 15°) = 60°$ and has therefore in all made a rotation of $120° + 60° = 180°$. Further, according to the invention the four tools are held together in a tool bar. In the present example care must then be taken that the tools all project the same distance 51 from the tool holder and are at the same distance 52 apart.

The tool holder 53 according to Figure 5 is not of square, but of triangular form. Its non-parallel edges 54 both stand at an angle, in this case 30°, to the working direction 55 of the work piece 56. The grooves, indicated by dotted lines 57, for the reception of the tools 58 held together by socketed members thus give an overlap to the tools without any skewing of the tool holder. This embodiment has the advantage, that when the tool holder is rotated through 180° in the direction of the arrow 59, the tool holder comes into the position indicated by the dotted lines 60. The angle of rotation therefore remains constant and equal to 180°. Nevertheless on the return stroke also the tools take a skewed position at 30° to the direction of movement of the work piece. In this case therefore it is all the same whether the spindle is moved longitudinally out of engagement with a claw coupling and always rotated in the same direction or whether a longitudinal movement is eliminated and the spindle is simply oscillated between corresponding stops and, as above described, firmly clamped. This embodiment presents simplifications in that the angle of rotation is of constant value and when rotation in alternating directions is used in that a reciprocation of the spindle is eliminated.

The tool holder 61 shown in Figure 6 is in general of approximately sector shape and has two surfaces 62, 63 at an angle in this case of about 120°. The surface 62 forms an angle to the direction 55 of movement of the workpiece 56 of 15°. At the end of this working stroke the spindle is rotated in the direction of the arrow 64 so that the tool holder 61 now comes into the dotted line position. The surface 63 now forms an angle of 15° to the direction of movement which is now reversed at 180° to arrow 55. The rotation takes place about the tool holder axis 65 (coaxial with spindle 15) which is so inclined (as described in connection with tool holder arrangement of Fig. 4) to the surface being machined that the tools not in operation stand clear of this surface. As can be seen from the drawing the angle of rotation of the spindle in this case is but 30°.

The tool bar according to Figure 7 consists of the actual bar 66 on which four projections 67 are formed so that they are in one piece therewith. These projections are bent over at an angle and when the tool bar is clamped on the tool holder extend downwards towards the workpiece. On their front surfaces 68 they carry in known manner bits 69 in the form of plates which are welded to the projections 67 and are ground to the appropriate angles. The cutting edges 70 of the bits are at an acute angle of in this case 15° to the corresponding end faces 71 of the tool bar 71 and thus after clamping of the bar in the tool holder stand perpendicular to the direction of movement of the workpiece 31.

The angle bar 72 according to Figure 8 consists of two bars such as that of Figure 7 united in a single piece at an angle 73. In this example the angle 73, and therefore also the angle which the cutting edges 74 makes with the limbs of the angle bar, is 60°. In other respects the projections 75 are made exactly corresponding with those according to Figure 7.

The angle bar 76 according to Figure 9 has two limbs at an angle 77 of 120°. They are each provided with four projections 78, the cutting edges 79 of which in contradistinction to those of the angle bar according to Figure 8, are turned away from the vertex of the angle bar. The cutting edges 79 are at an angle 80 of 15° to the perpendicular 81 to the limb. This angle corresponds to the angle which the respective limb takes during cutting to the direction of movement of the work piece.

Figure 1:
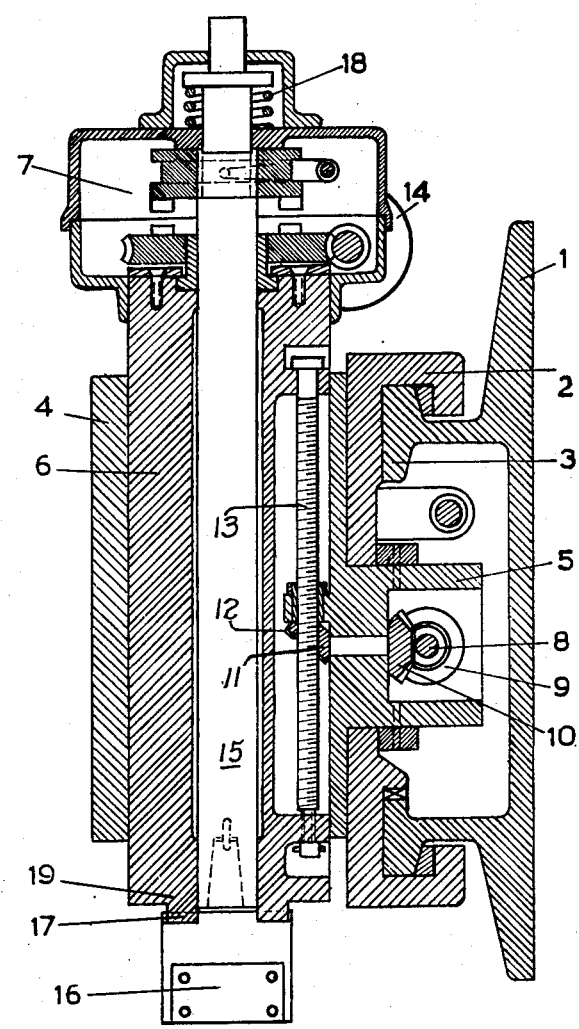
Figure 1 is a detail of a planing machine according to the invention, in longitudinal section through the multi-sided holder.
Figure 10:
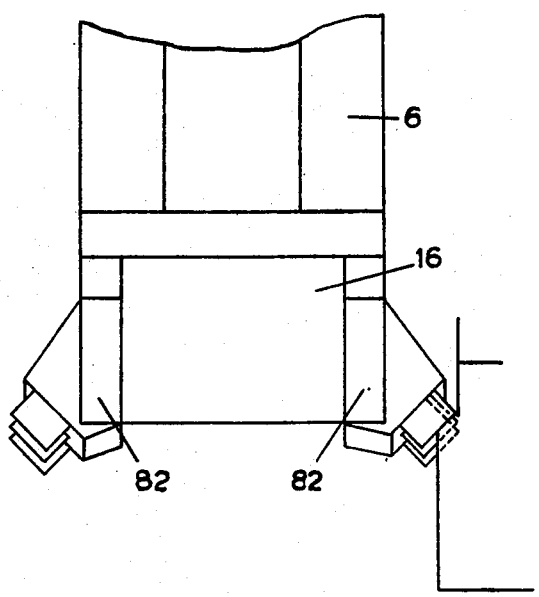
Figures 10 and 11 show diagrammatically a tool holder for side planing.
Figure 11:
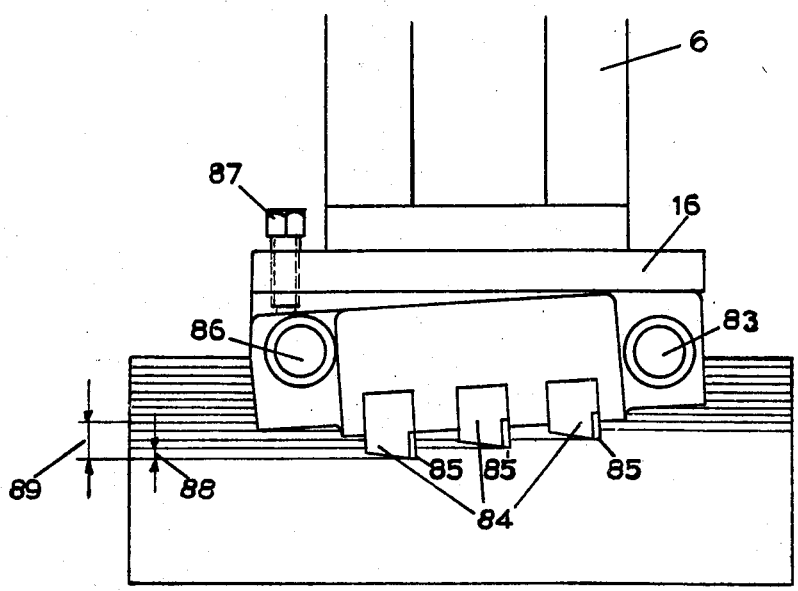

An arrangement for adjusting the skew angle of the tools in planing a side surface is diagrammatically illustrated in front view in Figure 10 and in side view in Figure 11. The tool holder 16 is shown at the lower end of the prismatic member 6, in a position corresponding to that of Figure 1. It is of square cross section. On two of its end surfaces two tool bars 82 are arranged opposite one another, which, as Figure 11 shows are mounted so that they can be swung downward about a bolt 83. The tool bars could for example be forged pieces, cast steel parts or worked out of the solid. On their projections 84 on the cutting side, bits 85 of plate form are welded. The bar is skewed and each bit is overlapped beyond the preceding in relation to the working direction by corresponding adjustment of an eccentric bolt 86 which is borne in the tool holder 16 and in the two tool bars 82. Two adjusting screws 87 take up any play of the bolt 86 in its bearings after skew adjustment of the overlap has been effected. It will be apparent that in this way the vertical thickness 88 of the chip can at any time be adjusted and thus the feed 89 which has to be given after each working stroke and which in this case must be equal to three times the vertical chip thickness.

The arrangement for skewing the tool bar 82 in relation to the tool holder 16 instead of by means of eccentric bolt and adjusting screw, can be effected in any other suitable way. Also the skewing of the tool bars can be adjustable in a horizontal plane at 90° to the plane of the drawing, so that a similar arrangement can also be used when horizontal surfaces are to be machined flat.

Figure 12:
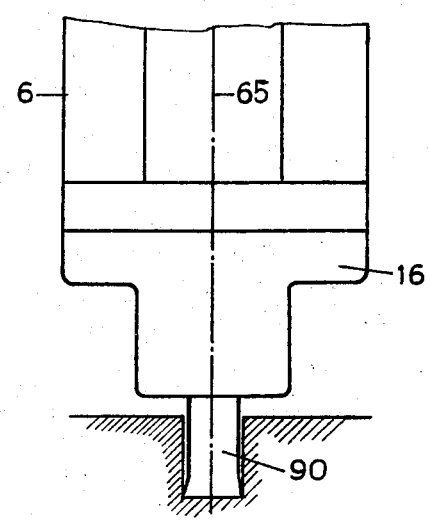
Figures 12 and 13 show an arrangement for planing plain grooves.
Figure 13:
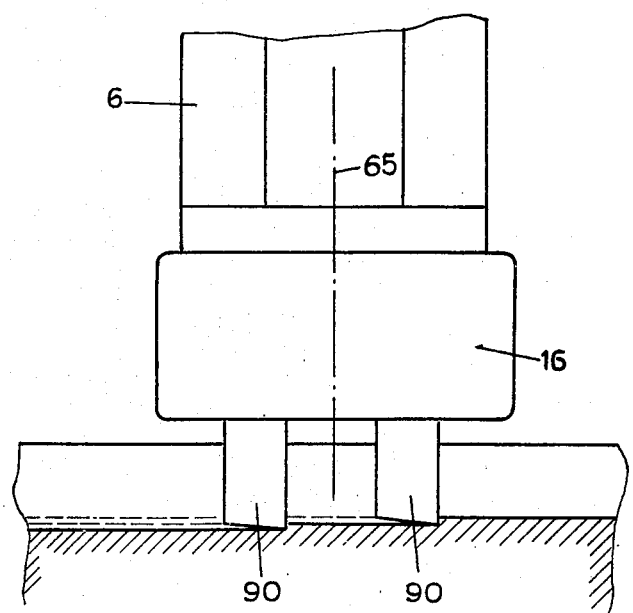

In Figures 12 and 13 an arrangement is shown which serves for machining grooves, utilising the return stroke. The tool holder 16 in this case has tools which seen in the working direction do not project laterally, but the tools 90 which though eccentrically disposed, lie in the working direction in extension of the spindle axis 65. The tools are arranged at different depths, so that again two cuts are taken at each stroke. The speed is effected by setting the prismatic member 6 further down in the multi-sided holder 4 in Figure 1.

To machine T-slots after previous machining of a plain groove as above, a device according to Figures 14 and 15 may serve. Figure 14 corresponds with Figure 12 while Figure 15 is a diagrammatic view in plan of the work piece. The separately ground tools 92 which cut laterally are secured in the tool holder 16 with their cutting edges equidistant from the axis 65 of the spindle 15 in a manner corresponding to that of Figure 12. The feed is effected here not by lateral movement of one part, e. g. the tool head 2 as in Figure 1, but by rotation of the holder with the spindle 15 on its axis 65 through an angle, the total feed angle being indicated at 93. It is true that the rake angle and clearance angle of the tool changes in relation to the work piece through this, but with suitable eccentricity of the tools in relation to the spindle axis 65, the change is within permissible limits. This requirement can always and in all cases be met by making the distance of the tools from the spindle axis so great that the total change of angle takes a permissible value.

I claim:

1. In a tool for planing or shaping machines having a plurality of groups of cutting edges adapted to be selectively engaged with material to be worked by rotation of the tool about an axis angularly disposed to a line perpendicular to the surface of said material, the combination including, a first group of cutting edges disposed for engagement with the material in skewed relation to the line of relative movement between the tool and the material in one direction when the tool is held in one position, and a second group of cutting edges disposed for engagement with the material in skewed relation to said line of movement in the reverse direction when the tool is held in a second position, the angle subtended between said first and second groups of cutting edges being 180 degrees less twice the angle of skew of said cutting edges less the angle of rotation between said first and second positions of the tool.

2. In a planing or shaping machine having a rotatably mounted tool head, the combination including, a member slidably supported by the tool head for movement perpendicular to the direction of relative movement between a tool and material to be worked, tool holder means, spindle means for the tool holder means slidably rotatably supported by said slidable member for movement along and about an axis parallel to the direction of movement of said slidable member, gear means for rotating the spindle means, and coupling means between the tool holder and the slidable member, said coupling means being effective when the spindle means is longitudinally displaced in one direction to prevent rotation of the tool holder, said coupling means being disengaged by longitudinal displacement of the spindle means in the reverse direction.

3. Apparatus as defined in claim 2, in which said tool head is longitudinally recessed to receive said slidable member, said recess and said slidable member being uniform in cross-section over their length, at least a portion of said cross-section being of straight-line configuration to prevent relative rotation between the slidable member and the tool head, said coupling means including coacting stop members on the slidable member and the tool holder, all for the purpose of preventing relative rotation between the tool holder and the tool head when said coupling means is effective.

4. In a machine for planing or shaping and of the type having a tool holder rotatable about an axis substantially perpendicular to the working surface and means for relatively moving a workpiece and said tool holder, the improvement comprising a plurality of groups of chisels secured to said tool holder, said groups being symmetrically disposed about said axis and at equal distances therefrom, the cutting edges of the chisels of respective groups being disposed for cutting during opposite directions of such relative movement, means for indexing said tool holder about its axis after each working stroke to bring a different group of chisels into operation, and means for rigidly clamping said toolholder in position during each working stroke.

5. In a machine for planing and shaping and of the type having a base, an upright support thereon and a toolholder rotatable on said support about an axis substantially perpendicular to the working surface and means for relatively moving a workpiece and said toolholder in a reciprocatory manner, the improvement comprising a plurality of chisels secured to said toolholder symmetrically about one end thereof and at equal distances from said axis, the cutting edges of respective chisels being disposed for cutting during opposite directions of such relative movement, means for indexing said tool holder about its axis after each working stroke to bring a different chisel into operation, and means for rigidly clamping said toolholder and all of its supporting parts to one another during each working stroke.

6. A machine in accordance with claim 5 in which there are more than two chisels secured to said toolholder, and in which the axis of rotation of said holder is inclined from the perpendicular to said working surface sufficiently to provide clearance for all of said chisels other than the one in use.

7. A machine in accordance with claim 4 in which the chisels of each group have their cutting edges in stepped relation to one another.

8. A machine in accordance with claim 4 in which the groups of chisels are disposed in polygon arrangement, the angle between successive sides of said polygon being equal to 180° less twice the value of the set-off angle and of the angle of swing of said tool holder.

OSKAR WALDRICH.

References Cited in the file of this patent

UNITED STATES PATENTS

| Number | Name | Date |
|---|---|---|
| 798,856 | Wetter | Sept. 5, 1905 |
| 934,078 | Kuwada | Sept. 14, 1909 |
| 1,945,535 | Schlitz | Feb. 6, 1934 |
| 2,252,655 | Young et al. | Aug. 12, 1941 |
| 2,358,897 | Walter | Sept. 26, 1944 |
| 2,543,661 | Edlich et al. | Feb. 27, 1951 |

FOREIGN PATENTS

| Number | Country | Date |
|---|---|---|
| 598 | Great Britain | Jan. 15, 1885 |
| 485,686 | Great Britain | May 24, 1938 |
| 545,060 | Great Britain | May 8, 1942 |